UNITED STATES PATENT OFFICE.

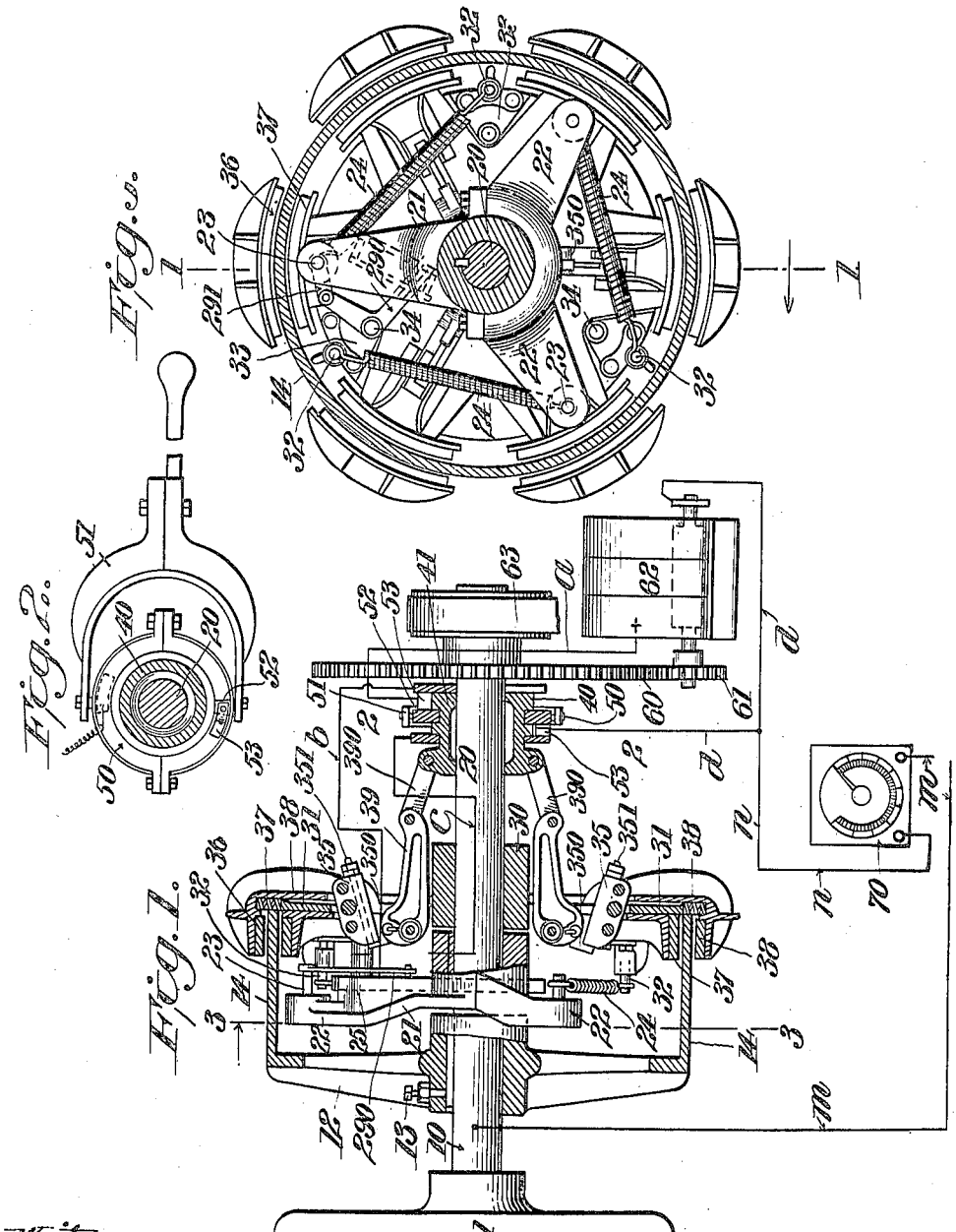

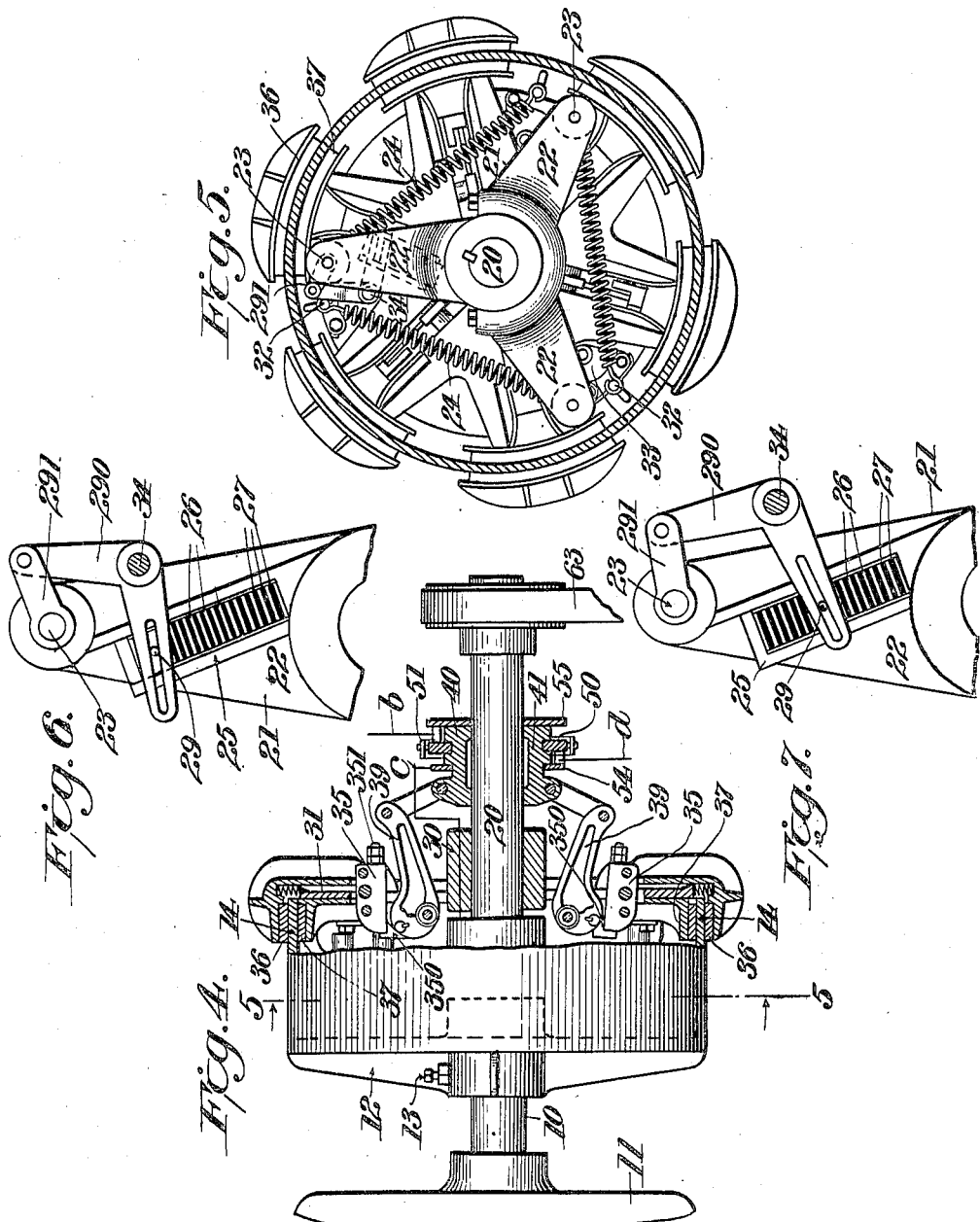

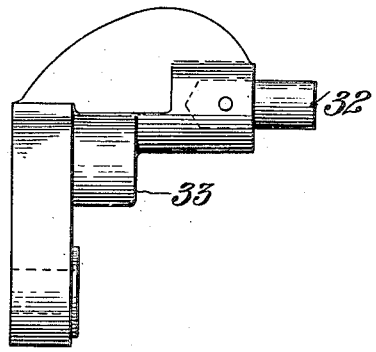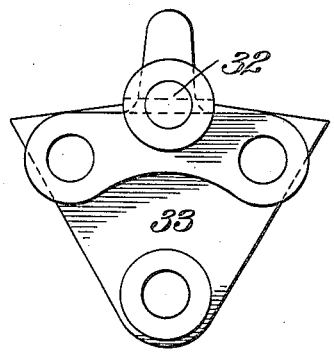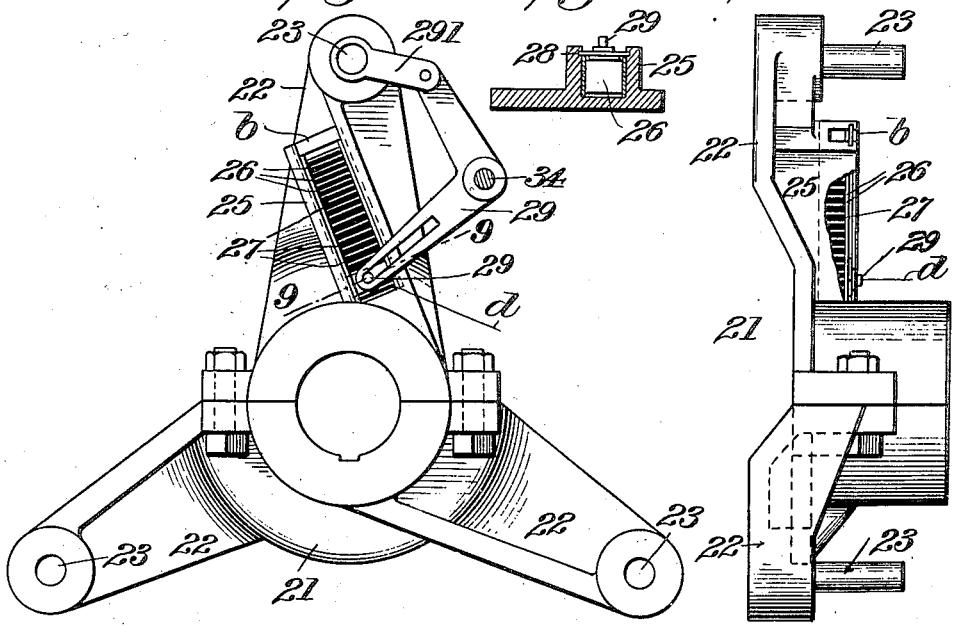

JOHN A. RANDALL, OF BROOKLYN, NEW YORK.

DYNAMOMETER.

1,134,418.  Specification of Letters Patent.  Patented Apr. 6, 1915.

Application filed April 25, 1913. Serial No. 763,574.

*To all whom it may concern:*

Be it known that I, JOHN A. RANDALL, a citizen of the United States, residing at 215 Ryerson street, Brooklyn, in the county of Kings and State of New York, have invented certain new and useful Improvements in Dynamometers, of which the following is a specification.

This invention relates to dynamometers and its novelty consists in the construction and adaptation of the parts as will be more fully hereinafter pointed out.

The object of the invention is to provide a simple and efficient means for readily indicating the amount of power transmitted through a mechanism or the amount of energy consumed in actuating a mechanism.

In the drawings, Figure 1 is a central longitudinal section and partial side elevation of a form of device embodying my invention; Fig. 2 is a section on the plane of the line 2—2 in Fig. 1; Fig. 3 is a section on the plane of the line 3—3 in Fig. 1; Fig. 4 is a view similar to Fig. 1, showing the jaws closed, some of the parts shown in Fig. 1 being omitted; Fig. 5 is a view similar to Fig. 3, showing the transmitting springs distended; Figs. 6 and 7 are details showing the sliding contactors in different positions; Fig. 8 is an enlarged view of the clutch spider; Fig. 9 is a section on the plane of the line 9—9 in Fig. 8; Fig. 10 is an edge view of the parts shown in Fig. 8; Fig. 11 is an enlarged side elevation of the stud bracket mounted on the clutch disk, and Fig. 12 is a front elevation thereof.

In the drawings 10 is a driving shaft supported in suitable bearings (not shown) and driven from any suitable source of power indicated at 11; 12 is a clutch ring secured to the shaft 10 by suitable means indicated at 13 and having an annular flange 14.

20 is a driven shaft, supported in suitable bearings (not shown). Secured to this shaft is a spider 21 having a plurality of radial arms 22, each of which has near its extremity a stud 23 adapted to serve as a support for one end of a spring 24.

Loosely mounted on the shaft 20 is a hub 30 carrying a disk 31, provided near its periphery with a number of studs 32, each mounted on a bracket 33 secured to the disk 31 by bolts 34 or other suitable means. These studs 32 serve each as a support for one end of each spring 24 and are caused to project toward the clutch ring in order that these springs shall clear the arms 22 of the spider 21.

On the disk 31 at suitable intervals are centrally pivoted a series of rocking arms 35 to each of which are pivotally secured a pair of jaws 36 and 37, adapted to embrace the flange 14 of the clutch ring 12 and the shanks 38 of which jaws are each slidably mounted in slideways upon the disk 31 and adapted to be moved radially thereon. Each rocking arm is provided with a wedge member 350 adapted to be adjusted by a bolt indicated at 351. Pivoted on the disk 31 near each rocking arm 35 is a cam lever 39, one edge of which is adapted to engage the wedge 350 of the rocking arm 35. This lever is pivoted to a toggle link 390 which, in turn, is pivoted to a shifter 40 loosely mounted on the shaft 20. It will be understood that there are a series of these rocking arms, cam levers and toggle links.

The shifter 40 comprises a barrel 41 provided with a peripheral groove on which is loosely mounted a yoke 50, to which is permanently pivoted a shifter arm 51 (see Fig. 2). On the yoke 50 at any convenient places and mounted on bases 52 of insulating material are two brushes indicated at 53, 53. Secured to the shifter barrel are a plurality of slip rings 54, 55, one of which is adapted to coöperate with each brush.

Mounted near the end of the shaft 20 is a gear 60 adapted to mesh with and drive a pinion 61 of a magneto indicated at 62. Power connection from the end of the shaft 20 to the machines to be actuated therefrom are indicated by a belt 63 leading to a pulley (not shown).

The magneto may be driven from the shaft 10 or even independently of the described mechanism if desired, or any other suitable source or electrical energy may be employed.

On one of the arms 22 of the spider 21 is mounted a rheostat indicated at 25, and comprising a number of plates 26 made of conducting material with plates of insulating material 27 between them. A slideway indicated at 28 is arranged adjacent to these plates and slidably mounted thereon is a movable contactor indicated at 29. This contactor is secured at one end of a bell crank lever 290 pivoted on the bracket 33 by the bolt 34, and the other end of which is pivoted to a link 291 secured to the stud 23 of the arm 22 on which the rheostat is mounted.

An electrical circuit is provided by suitable conductors as follows: A conductor $a$ leads from the plus (+) side of the magneto 62 to the brush 53 of the slip ring 55, a second conductor $b$ leads from this slip ring to one end of the rheostat 25; a third conductor $c$ leads from the other end of the rheostat to the slip ring 54, and a fourth conductor $d$ leads from the brush 53 of this slip ring to the minus (—) side of the magneto 62.

A voltmeter 70 of any suitable construction is placed conveniently near the device as above described, and its dial is either graduated as usual to show the voltage or is specially graduated to indicate horse powers or some other convenient functional notation of the voltage.

A conductor $m$ leads from the shaft 10 to one side of the voltmeter and a second conductor $n$ joins the other side of the voltmeter to the conductor $d$.

When the machine is to be used, the driven shaft 20 is first connected to the mechanism to be tested. The shifter 40 is then moved toward the left (as seen in Fig. 4) by means of the shifter arm 51. This moves the toggle links 390, and the cam levers 39, and the latter engaging the wedges 350 of the rocking arms 35 moves these arms causing them to actuate the pairs of jaws 36 and 37, which grip the annular flange 14 of the clutch ring 12.

The clutch ring 12 being keyed to the shaft 10 moves with it, and motion is thus imparted through the jaws 36 and 37 to the disk 31 and consequently to the studs 32, and the draft springs 24 each secured at one end to one of these studs are stretched until the studs 23 of the spider and consequently the spider itself is moved and motion is thus imparted to the driven shaft 20. As the spider 21 is thus circularly moved with respect to the disk 31, the bell crank lever 290 is moved and the sliding contactor 29 is moved along the slideway 28 of the rheostat 25.

As a constant current passes normally through the electrical system, when the sliding contactor 29 stops at any one of the conducting plates 26 of the rheostat it grounds that plate. This allows a very small fractional part of the total current traveling from the magneto to escape to the spider 21 and shaft 10 and thence to pass through the voltmeter and return to the magneto through the conductors $u$ and $d$.

The parts are so arranged that the terminals of the conductors $m$ and $c$ at the rheostat are electrically the same when the clutch has not been actuated. As the voltmeter terminals are in such case between points having a negligible resistance between them, the voltmeter will indicate a negligible small reading or zero. But when the clutch is actuated and the power is transmitted from the driving shaft 10 to the driven shaft 20 through the spider 21 and disk 31, and the springs are stretched and that arm 22 of the spider to which the link 291 is pivoted is moved, then it is evident that the extent of this movement and consequently of the sliding contactor 29 of the rheostat 25 is a function of the power transmitted from one shaft to the other and a measure of such power when the speed is constant. When, however, the sliding contactor moves it grounds a plate 26 other than the one with which it contacted before such movement and there will then be a greater resistance between the terminals where the conductors $m$ and $n$ are connected to the voltmeter, and the voltmeter indicator will move to a reading which will indicate the amount of such resistance and consequently the amount of power transmitted.

By the use of a magneto suitable to supply a current proportional to the speed within the range of variation required in any given sense the voltage between any two contact points may be made to vary in direct proportion to the speed. And since the sliding contactor is moved over a number of points in proportion to the torque and the voltage between such points varies as the speed, the voltmeter reading will vary as the product of the torque and speed or the power. Therefore, by using a properly graduated scale in the voltmeter this instrument will indicate directly the power transmitted.

What I claim as new is:

1. In combination a driving shaft, a driven shaft, a spider secured to the driven shaft, a disk loosely mounted on the same shaft, a clutch connecting the disk to the driving shaft, a spring connecting the disk and the spider, a contactor, a lever actuated from the spider to move the contactor, a rheostat over which the contactor is adapted to move and a source of electrical energy in circuit with the rheostat.

2. In combination, a driving shaft, a driven shaft, a spider secured to the driven shaft, a disk loosely mounted on the same shaft, a clutch connecting the disk to the driving shaft, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the rheostat due to the movement of the contactor.

3. In combination a driving shaft, a driven shaft, a spider secured to the driven shaft, a disk loosely mounted on the same shaft, a clutch connecting the disk to the driving shaft, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the rheostat due to the movement of the contactor, including a voltmeter.

4. In combination a driving shaft, a driven shaft, a spider secured to the driven shaft, a disk loosely mounted on the same shaft, a clutch connecting the disk to the driving shaft, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the rheostat due to the movement of the contactor, including a voltmeter graduated in terms of the power transmitted between the driving and the driven shafts.

5. In combination a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move and a source of electrical energy in circuit with the rheostat.

6. In combination a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the rheostat due to the movement of the contactor.

7. In combination a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the rheostat due to the movement of the contactor, including a voltmeter.

8. In combination a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the rheostat due to the movement of the contactor, including a voltmeter graduated in terms of the power transmitted between the driving and the driven shafts.

9. In combination a driving shaft, a driven shaft, a spider secured to the driven shaft, a disk loosely mounted on the same shaft, a clutch connecting the disk to the driving shaft, a shifter loosely mounted on the driven shaft and provided with a brush and two slip rings each in contact with the brush, a rheostat, a source of electrical energy in circuit with the slip rings and the rheostat, a spring between the disk and the spider, a lever actuated from the spider, and a sliding conductor moved by the lever in proportion to the stretch of the spring along the rheostat.

10. In combination a driving shaft, a driven shaft, a spider secured to the driven shaft, a disk loosely mounted on the same shaft, a clutch connecting the disk to the driving shaft, a shifter loosely mounted on the driven shaft and provided with a brush and two slip rings each in contact with the brush, a rheostat, a source of electrical energy in circuit with the slip rings and the rheostat, a spring between the disk and the spider, a lever actuated from the spider, and a sliding conductor moved by the lever in proportion to the stretch of the spring along the rheostat, and a voltmeter also in circuit with the rheostat and adapted to measure the extent of the variation of the resistance therein due to the movement of such sliding conductor.

11. In combination, a driven shaft, a drive shaft, a spider secured to the shaft, a disk loosely mounted on the hub of the spider, a clutch connecting the disk to the driving shaft, a shifter loosely mounted on the driven shaft and provided with a brush and two slip rings each in contact with the brush, a rheostat, a source of electrical energy in circuit with the slip rings and the rheostat, a spring between the disk and the spider, a lever actuated from the spider, and a sliding conductor moved by the lever in proportion to the stretch of the spring along the rheostat, and a voltmeter also in circuit with the rheostat and adapted to measure the extent of the variation of the resistance therein due to the movement of such sliding conductor.

12. In combination, a driving shaft, a driven shaft, a spider secured to the driven shaft, a disk loosely mounted on the same shaft, a clutch connecting the disk to the driving shaft, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the voltmeter circuit due to the movement of the contactor.

13. In combination, a driving shaft, a driven shaft, a spider secured to the driven shaft, a disk loosely mounted on the same shaft, a clutch connecting the disk to the driving shaft, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the voltmeter circuit due to the movement of the contactor, including a voltmeter.

14. In combination, a driving shaft, a driven shaft, a spider secured to the driven shaft, a disk loosely mounted on the same shaft, a clutch connecting the disk to the driving shaft, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the voltmeter circuit due to the movement of the contactor, including a voltmeter graduated in terms of the power transmitted between the driving and the driven shafts.

15. In combination, a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the voltmeter circuit due to the movement of the contactor.

16. In combination, a driving shaft, a driven shaft a spider secured to the driven shaft, a disk loosely mounted on the main shaft, a clutch connecting the disk to the driving shaft, a shifter for operating the clutch, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the voltmeter circuit due to the movement of the contactor, including a voltmeter.

17. In combination, a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move and a source of electrical energy in circuit with the rheostat, and means for indicating the variations in the resistance in the voltmeter circuit due to the movement of the contactor, including a voltmeter graduated in terms of the power transmitted between the driving and the driven shafts.

18. In combination, a driving shaft, a driven shaft, a spider secured to the driven shaft, a disk loosely mounted on the same shaft, a clutch connecting the disk to the driving shaft, a shifter loosely mounted on the driven shaft and provided with two slip rings a brush on the shifter in contact with said rings, a rheostat, a source of electrical energy in circuit with the slip rings and the rheostat, a spring between the disk and the spider, and a sliding conductor moved in proportion to the stretch of the spring along the rheostat, and a voltmeter also in circuit with the rheostat and adapted to measure the extent of the variation of the resistance in the voltmeter circuit due to the movement of such sliding conductor.

19. In combination, a driving shaft, a driven shaft, a spider secured to the driven shaft, a disk loosely mounted on the same shaft, a clutch connecting the disk to the driving shaft, a spring connecting the disk and the spider, a contactor a lever actuated from the spider to move the contactor, a rheostat over which the contactor is adapted to move, and means connected with the driven shaft for producing an electro-motive force in proportion to the speed of the latter, and means for indicating the variations in the resistance in the rheostat due to the movement of the contactor.

20. In combination, a driving shaft, a driven shaft, a spider secured to the driven shaft, a disk loosely mounted on the same shaft, a clutch connecting the disk to the driving shaft, a contactor, a spring connecting the disk and the spider, a lever actuated from the spider to move the contactor, a rheostat over which the contactor is adapted to move, and means connected with the driven shaft for producing an electro-motive force in proportion to the speed of the latter, and means for indicating the variations in the resistance in the rheostat due to the movement of the contactor, including a voltmeter.

21. In combination, a driving shaft, a driven shaft, a spider secured to the driven shaft, a disk loosely mounted on the same shaft, a clutch connecting the disk to the driving shaft, a spring connecting the disk and the spider, a contactor, a lever actuated from the spider to move the contactor, a rheostat over which the contactor is adapted to move and means connected with the driven shaft for producing an electro-motive force in proportion to the speed of the latter, and means for indicating the variations in the resistance in the rheostat due to the movement of the contactor, including a voltmeter graduated in terms of the power transmitted between the driving and the driven shafts.

22. In combination a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move and means connected with the driven shaft for producing an electro-motive force in proportion to the speed of the latter.

23. In combination, a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move, and means connected with the driven shaft for producing an electro-motive force in proportion to the speed of the latter, and means for indicating the variations in the resistance in the rheostat due to the movement of the contactor.

24. In combination, a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move, and means connected with the driven shaft for producing electro-motive force in proportion to the speed of the latter, and means for indicating the variations in the resistance in the rheostat due to the movement of the contactor, including a voltmeter.

25. In combination, a driving shaft, a driven shaft, a spider secured to the driven shaft, a disk loosely mounted on the same shaft, a clutch connecting the disk to the driving shaft, a shifter for operating the clutch, a spring connecting the disk and the spider, a contactor, a lever actuated from the spider to move the contactor, a rheostat over which the contactor is adapted to move, and means connected with the driven shaft for producing an electro motive force in proportion to the speed of the latter, and means for indicating the variations in the resistance in the rheostat due to the movement of the contactor, including a voltmeter graduated in terms of the power transmitted between the driving and the driven shafts.

26. In combination a driving shaft, a driven shaft, a spider secured to the driven shaft, a disk loosely mounted on the same shaft, a clutch connecting the disk to the driving shaft, a shifter loosely mounted on the driven shaft and provided with a brush and two slip rings each in contact with the brush, a rheostat, means connected with the driven shaft for producing an electro-motive force in proportion to the speed of the latter, a spring between the disk and the spider, and a sliding conductor moved in proportion to the stretch of the spring along the rheostat.

27. In combination a driving shaft, a driven shaft, a spider secured to the driven shaft, a disk loosely mounted on the same shaft, a clutch connecting the disk to the driving shaft, a shifter loosely mounted on the driven shaft and provided with two slip rings, brushes on the shifter in contact with the slip rings, a rheostat, means connected with the driven shaft for producing an electro-motive force in proportion to the speed of the latter, a spring between the disk and the spider, and a sliding conductor moved in proportion to the stretch of the spring along the rheostat, and a voltmeter also in circuit with the rheostat and adapted to measure the extent of the variation of the resistance therein due to the movement of such sliding conductor.

In testimony whereof I affix my signature in presence of two witnesses.

JOHN A. RANDALL.

Witnesses:
CLARENCE G. CAMPBELL,
MARY H. LEWIS.